United States Patent [19]

Kikuta

[11] Patent Number: 5,604,723
[45] Date of Patent: Feb. 18, 1997

[54] METHOD FOR READING A SYNCHRONIZING SIGNAL FROM A RECORD MEDIUM AND AN APPARATUS THEREOF

[75] Inventor: Kazuyoshi Kikuta, Nagoya, Japan

[73] Assignees: Fujitsu Limited, Kawasaki; Fujitsu VLSI Limited, Kasugai, both of Japan

[21] Appl. No.: 642,575

[22] Filed: Jan. 17, 1991

[30] Foreign Application Priority Data

Jan. 17, 1990 [JP] Japan .................................. 2-007843

[51] Int. Cl.⁶ ........................................................ G11B 7/00
[52] U.S. Cl. ............................ 369/48; 369/58; 369/53
[58] Field of Search ................... 369/48, 49, 50, 369/53, 44.26, 32, 58, 59; 360/37.1, 51, 48; 358/336, 342, 319; 371/42, 47.1

[56] References Cited

U.S. PATENT DOCUMENTS

| | | | |
|---|---|---|---|
| 3,873,920 | 3/1975 | Apple, Jr. et al. | 371/42 |
| 4,302,831 | 11/1981 | Zemanek | 371/42 |
| 4,525,754 | 6/1985 | Handley | 360/51 |
| 4,663,752 | 5/1987 | Kakuse et al. | 369/124 |
| 4,774,701 | 9/1988 | Ozaki et al. | |
| 4,791,622 | 12/1988 | Clay et al. | 369/48 |
| 4,908,812 | 3/1990 | Aoshima et al | 360/51 |
| 5,233,589 | 8/1993 | Saito et al. | 369/48 |

FOREIGN PATENT DOCUMENTS

| | | |
|---|---|---|
| 0227530 | 7/1987 | European Pat. Off. . |
| 0232134 | 8/1987 | European Pat. Off. . |
| 0242093 | 10/1987 | European Pat. Off. . |
| 61-292270 | 12/1986 | Japan . |

*Primary Examiner*—Nabil Hindi
*Attorney, Agent, or Firm*—Nikaido, Marmelstein, Murray & Oram LLP

[57] ABSTRACT

This invention relates to a method and apparatus for reading out a synchronizing signal recorded in a data portion of each of a number of sectors stored in a recording medium such as an optical disc, a write-in-once type magneto-optical disc and so on. Even when detection of a synchronizing a signal has failed, the succeeding re-synchronizing signal can be detected reliably so that, although a first one divided unit portion of data is dropped out, data following the re-synchronizing signal can be read out positively, thus reducing data read error rate.

12 Claims, 8 Drawing Sheets

| I0 | I1 | I2 | Y0 | Y1 | Y2 | Y3 |
|----|----|----|----|----|----|----|
| L  | L  | L  | L  | L  | L  | L  |
| H  | L  | L  | H  | L  | L  | L  |
| L  | H  | L  | L  | H  | L  | L  |
| H  | H  | L  | L  | L  | H  | L  |
| L  | L  | H  | L  | L  | L  | H  |

Fig.6

METHOD FOR READING A SYNCHRONIZING SIGNAL FROM A RECORD MEDIUM AND AN APPARATUS THEREOF

BACKGROUND OF THE INVENTION

1. Field of the Invention

The present invention relates generally to a method and an apparatus for reading out a synchronizing signal from a recording medium and, more particularly, is directed to a method and an apparatus for reading out a synchronizing signal provided in a data portion of each sector stored in a recording medium such as an optical disc, a read only type optical disc or a write-in-once (WIO) type optical disc, a magneto-optical disc.

2. Description of the Prior Art

Recently, various reading methods and reading apparatuses have been proposed for reading out data recorded on an optical disc provided as a data recording medium.

In accordance with these reading methods, by reading out an address from a storage area (ID portion) in which an address of a sector is stored, it is determined whether or not the sector is a sector (target sector) containing data to be read out. If it is the target sector, then data recorded in a data storage area (data portion) following the ID portion is read out next. Data is read out from the data portion on the basis of the sync. signal and re-sync. signal recorded in it.

More specifically, the format of each sector on the optical disc is composed of an ID portion 10 and a data portion 11, as shown in FIG. 1. The data portion 11 comprises of a sync. data portion (SYNC) 11a at its head, a number of divided data portions 11b composed of 15 bytes or 20 bytes are formed and a re-sync. data portion (RESYNC) 11c is formed between the divided data portions 11b. Data recorded in the data portion 11 is recorded in a distributed manner in the respective divided data portions 11b. Sync. pattern data which becomes a sync. signal is recorded on the sync. pattern data portion 11a and re-sync. pattern data which becomes a re-sync. signal is recorded on the re-sync. data portion 11c. Then, on reading the data of the sector, data in the starting divided data portion 11b is read out on the basis of the data (sync. signal) in the sync. data portion 11a and data in the succeeding divided data portion 11b is read out on the basis of data (re-sync. signal) in the re-sync. data portion 11c. That is, data in the respective divided data portions 11b are read out at the detection timings of the sync. signal and the re-sync. signal.

Accordingly, data in the data portion 11 cannot be read out without detecting the sync. signal and the re-sync. signal.

However, conventionally, since the duration of the detection periods of the sync. signal and the re-sync. signal are determined beforehand, the sync. signal or the re-sync. signal must be detected within its detection period. Then, detection starting and ending timings of the limited detection period of the succeeding re-sync. signal are determined by the detection of the sync. signal. Thus, if the sync. signal cannot be detected, the succeeding re-sync. signal cannot be detected. There is then the substantial disadvantage that data cannot be read out from the optical disc at all.

As the recording density of the optical disc is 1 bit/$\mu$m$^2$ which is more than one digit bigger comparing with magnetic disc or magnetic tape, it is apt to be affected by micro fault and many bit errors are apt to occur. The bit error rate is about 10$^{-5}$ (one reading error per 10$^5$ bits) which is 4 to 5 digits larger comparing with recording media such as magnetic disc. Therefore, in particular, in an optical disc in which a read error occurs more frequently than with other recording media, frequent occurrence of such read errors of the sync. signal becomes a serious problem.

As described above, as the burst error is likely to occur in the optical disc comparing with the other recording media, data recording in the optical disc is performed such that the data (composed of user data and a control word) is divided into bits or word units and then is recorded by changing their orders. This is called interleave and by adapting this method burst errors are changed into random errors or short word errors, thereby the correcting capacity being increased. In case of data recording by interleave method, firstly an error check code called CRC (Cyclic Redundancy Check) or CRCC (Cyclic Redundancy Check Code) is formed in each one sector from data row of each interleave, then an error check code (ECC) composed of Read Solomon product code or Read Solomon Long Distance Code are generated based on above data and above CRC in each interleave. By recording by the interleave adding ECC in addition with the above CRC correcting capacity of the data is increased and thus bit error rate is decreased until 10$^{-12}$.

By forming CRC and ECC at each interleave and by recording the CRC and the ECC together with the data on the optical disc by interleave, when 1 sector is composed of 10 24 bytes it is possible to restore the correct data even if 80 byte errors occur in one sector of the data. Further, when 1 sector is composed of 512 bytes it is possible to restore to the correct data even if 40 bytes errors occur in one sector of the data. Therefore, it is important to detect the succeeding re-sync. signal even if detection of a sync. signal is failed for increasing the reliability of the data of the optical disc.

SUMMARY OF THE INVENTION

An object of the present invention is to provide a method and apparatus for reading out a sync. signal from a recording medium in which, even if the detection of the sync. signal fails, the succeeding re-sync. signal can be detected positively so that data following the first re-sync. signal can be read out reliably regardless of a drop-out of a first divided portion of data.

Another object of the present invention is to provide a method and apparatus for reading out a sync. signal from a recording medium in which the data-read error rate can be reduced.

As the first aspect of the present invention there is provided a method for reading a synchronizing signal from a recording medium in which, when synchronizing data is detected from the recording medium in which a number of sectors, each sector being composed of an address portion and a data portion having synchronizing pattern data at its head, the data portion being divided into a plurality of divided data portions and re-synchronizing pattern data being formed between the divided data portions, re-synchronizing pattern data to be detected next is detected within a predetermined detection period. This method is characterized in that, when detection of the synchronizing pattern data fails, the detection period of the re-synchronizing pattern data is prolonged to detect re-synchronizing pattern data.

In a method for reading a synchronizing signal from a recording medium in which, when synchronizing data is detected from the recording medium in which a number of sectors, each composed of an address portion and a data portion having synchronizing pattern data at its head, the data portion being divided into a plurality of divided data portions and re-synchronizing pattern data being formed between the divided data portion, re-synchronizing pattern data to be detection period, the method for reading a synchronizing signal from a record medium is characterized in that, when the detection of the synchronizing pattern data has failed, the detection period of the re-synchronizing pattern data is prolonged to detect re-synchronizing pattern data.

The apparatus for reading a synchronizing signal from the record medium according to the present invention is provided with the following means.

A synchronizing pattern detecting means is adapted to detect synchronizing pattern data provided at the head of a data portion read out from the record medium in which a number of sectors, each sector being composed of an address portion and a data portion having synchronizing pattern data at the head thereof, the data portion being divided into a plurality of divided data portions and re-synchronizing pattern data being formed between the divided data portions.

A re-synchronizing pattern detecting means is adapted to detect the re-synchronizing pattern data formed between the divided data portions read out from the recording medium.

A synchronizing pattern detecting and judging means is adapted to determine whether or not the synchronizing pattern data is detected successfully by the synchronizing pattern detecting means.

A re-synchronizing pattern detecting and judging means is adapted to determine within a pre-determined detecting and judging period whether or not the re-synchronizing pattern data is detected successfully by the re-synchronizing pattern detecting means.

A control means is adapted to prolong the detecting and judging period of the re-synchronizing pattern detecting and judging means on the basis of the judged result of the synchronizing pattern detecting and judging means when the synchronizing pattern detecting and judging means determines that the detection of the synchronizing pattern data by the synchronizing pattern detecting means has failed.

In the above described method for reading synchronizing signal from the record medium when the detection of the sync. pattern data has failed, the detecting period of the re-sync. pattern data is prolonged to thereby detect the re-sync. pattern data. Thus, even if the detection of the sync. pattern data fails, as the duration of the detecting period of the re-sync. pattern data to be detected next is prolonged compared with the case where the detection of the sync. pattern data is successful, a probability that the re-sync. pattern data is detected is increased.

Further, according to the above-described apparatus for reading the synchronizing signal from a record medium, when the sync. pattern data is not detected by the sync. pattern detecting means, the sync. pattern detecting and judging means determines that the sync. pattern detecting means has failed in detecting the synchronizing pattern data.

The control means controls the re-sync. pattern detecting and judging means on the basis of the judged result of this detection failure such that the duration of the detecting and judging period of the re-sync. pattern detecting and judging means is longer than the case where the re-sync. pattern detecting and judging means successfully detects the re-sync. pattern data.

As a result, when the detection of the synchronizing pattern is failed since the duration of the re-sync. pattern detecting period of the re-sync. pattern detecting means is automatically prolonged, the probability that the re-sync. pattern data is detected can be further increased.

BRIEF DESCRIPTION OF THE DRAWINGS

FIG. 6 is a truth value table;

DESCRIPTION OF THE PREFERRED EMBODIMENT

Now, an embodiment of a sync. signal reading apparatus for an optical disc according to the present invention will hereinafter be described with reference to FIG. 2.

Figure 2:
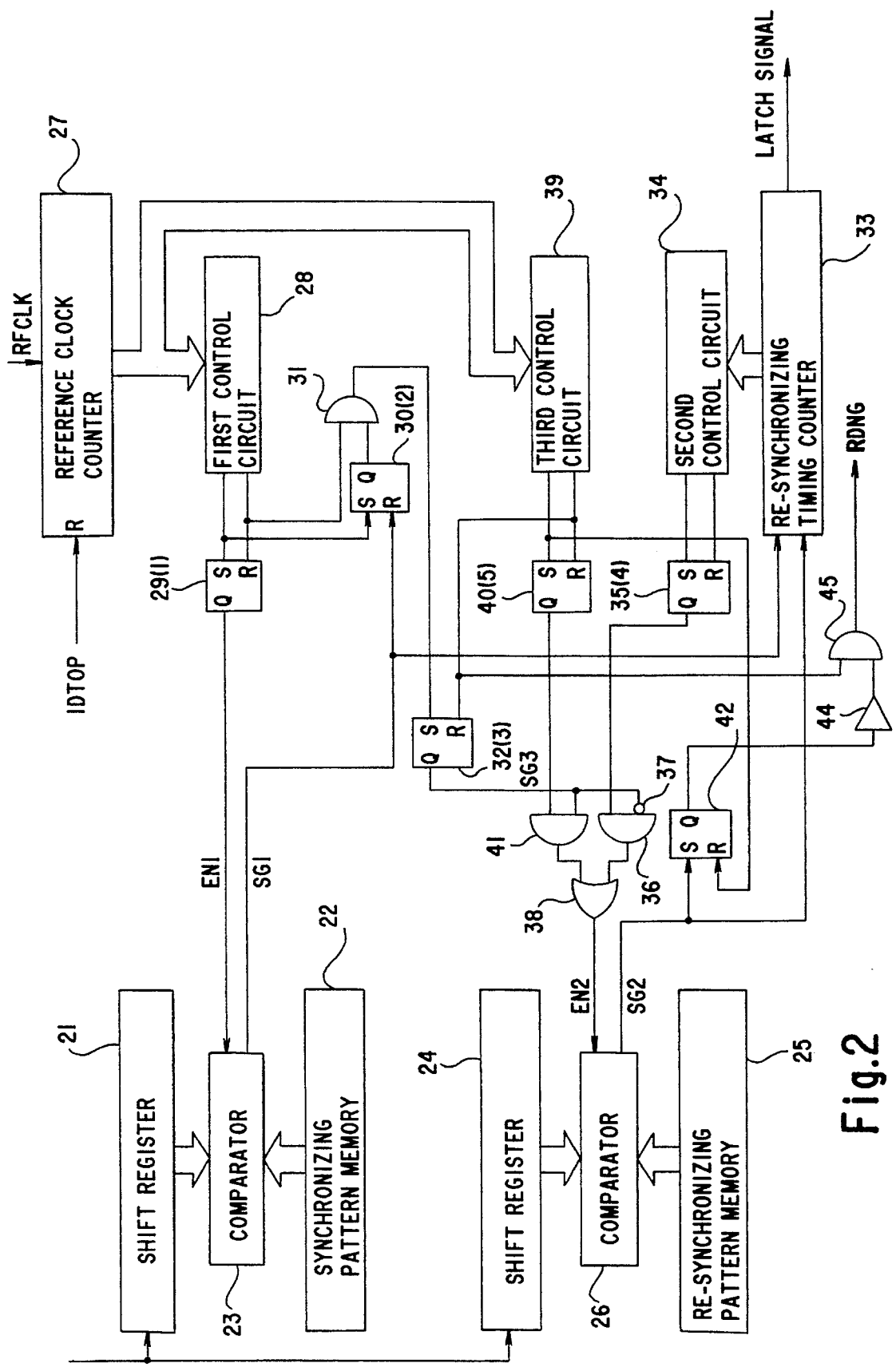
FIG. 2 is a circuit block diagram of a sync. signal reading apparatus which embodies the present invention.

Referring to FIG. 2, a shift register 21, a sync. pattern memory 22 and a comparator 23 constitute a sync. pattern detecting and a sync. pattern detection judging means. The shift register 21 is adapted to 48 bits of shift data one bit at a time each time data recorded and read out from an optical disc by a recording and reproducing optical head (not shown) is output one bit at a time from a signal processing circuit, not shown and to store therein a total of 48 bits of data. Accordingly, the shift register 21 stores the latest 48 bits of data.

Figure 1:
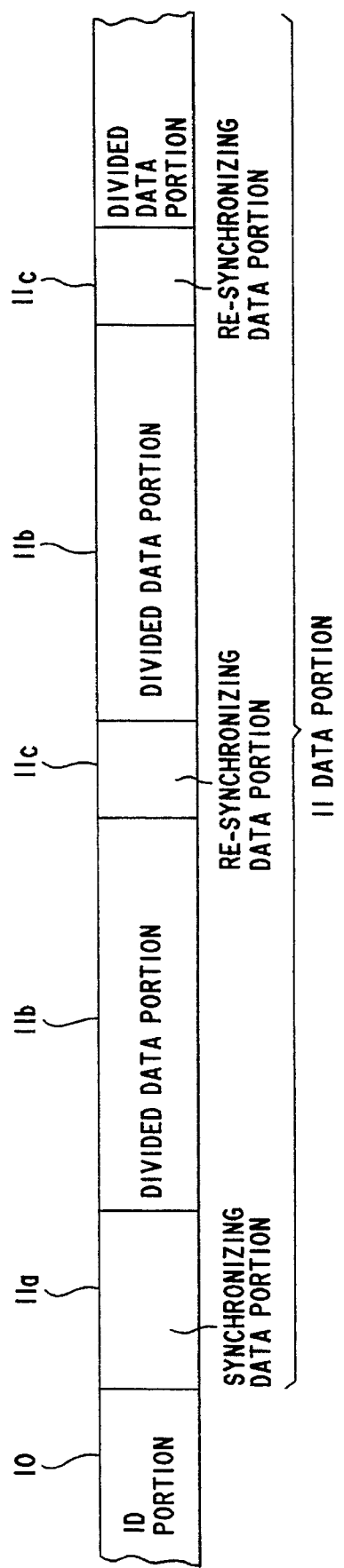
FIG. 1 is a schematic diagram showing the format of each sector in an optical disc.

The sync. pattern memory 22 is formed of a read only memory (ROM) and stores the same sync. pattern data as the sync. pattern data recorded in a sync. data portion 11a shown in FIG. 1, that is, the sync. pattern data comprising 48 bits of data.

The comparator (digital comparator) 23 compares the latest 48 bits of data read from the optical disc stored in the shift register 21 with the 48 bits of sync. pattern data stored in the sync. signal pattern memory 22 to thereby detect whether or not the sync. pattern data is involved in the data sequentially read out from the optical disc.

Figure 7:
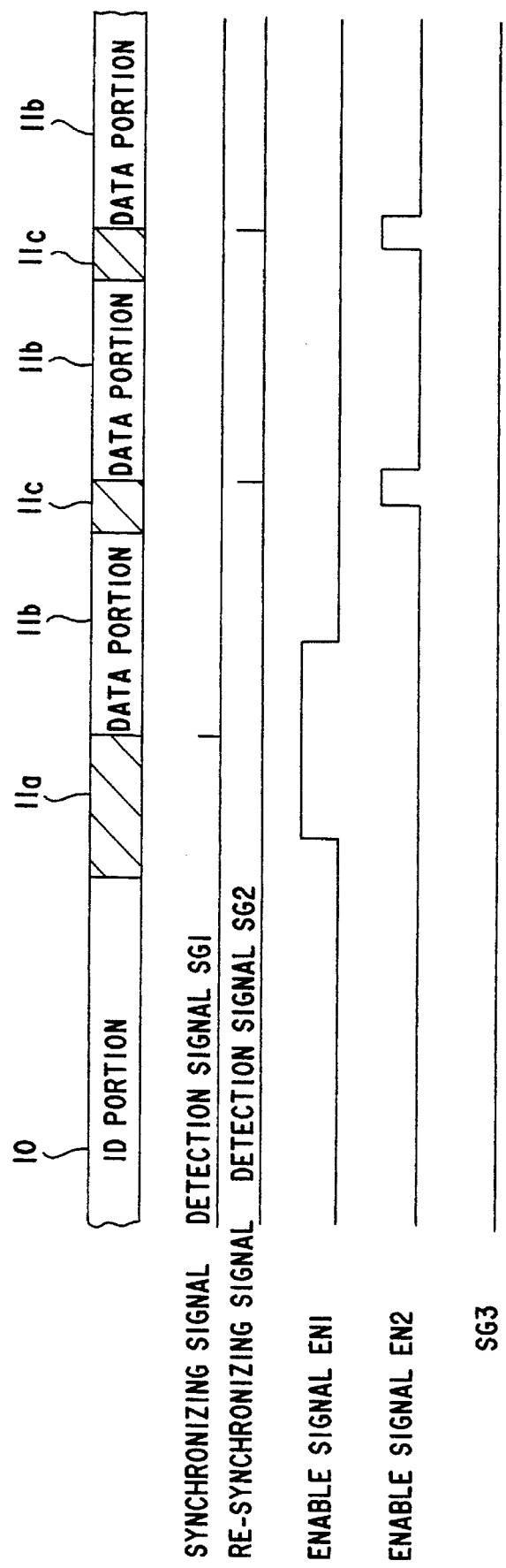
FIG. 7 is a timing chart of various signals used in the present invention, and to which references will be made in explaining a case where sync. pattern data is detected successfully.

A detection time of the comparator 23 for comparing and detecting the above described two data is controlled on the basis of an enable signal EN1 which will be referred to later. If it is determined during the detection time that the sync. pattern data is included in the data sequentially read out from the optical disc, that is, the latest 48 bits of data stored in the shift register 21, the comparator 23 outputs a sync. signal detecting signal SG1 (the pulse of the logic [H]), as shown in FIG. 7.

A shift register 24, a re-sync. signal pattern memory 25 and a comparator (digital comparator) 26 constitute a re-sync. pattern detecting means and non-synchronizing pattern detection judging means. The shift register 24 shifts data one bit at a time each time 16 bits of data recorded and read out from the optical disc by means of the recording and reproducing head (optical head) as described above is output one bit at a time from a signal processing circuit, not shown and stores a total of 16 bits of data of totally 16 bits. Accordingly, the shift register 24 stores the latest 16 bits of data read from the optical disc.

The re-sync. signal pattern memory 25 is a read only memory (ROM) and stores the same re-sync. pattern data as the re-sync. pattern data recorded in a re-sync. data portion 11c shown in FIG. 1, that is, the 16 bits of re-sync. pattern data.

Comparator 26 compares 16 bits of data stored in the shift register 24 and the re-sync. pattern data stored in 16 bits of the re-sync. signal pattern memory 25 to thereby detect whether or not the re-sync. pattern data is included in the data sequentially read out from the optical disc. A detection time for detecting the non-synchronizing pattern data of the comparator 26 is controlled on the basis of an enable signal EN2 which will be referred to later, and the comparator 26 outputs a re-sync. signal detecting signal SG2 (the pulse of the logical [H]) as shown in FIG. 7, if it is determined during the detection time that the re-sync. pattern data is included in the shift register 24.

Let us explain next a control means for controlling the detection times of the comparators 23 and 26 for detecting the sync. and re-sync. pattern data.

A reference clock counter 27 is an up-counter for performing a counting in synchronization with reference clock RFCLK generated from an external clock generator, not shown is reset and restarts the count operation each time a detecting means (not shown), for detecting data (VFO) recorded at the head of an ID portion of each sector outputs a detecting signal IDTOP. The count value of the reference clock counter 27 is supplied to a first control circuit 28.

The first control circuit 28 outputs a set trigger signal (logic [H]) when the count value of the reference clock counter 27 reaches a pre-determined first value (hereinafter referred to as a sync. pattern detection starting time), whereas the first control circuit 28 outputs a reset trigger signal (logic [H]) when the count value of the reference clock counter 27 becomes a predetermined second value (referred to hereinafter as a sync. pattern detection ending time) which is larger than the sync. pattern detection starting time.

The sync. pattern detection starting time and the sync. pattern detection ending time are values that are theoretically or experimentally obtained beforehand, and a time of highest probability in which the sync. pattern is stored in the shift register 21 and compared with the sync. signal pattern stored in sync. signal pattern memory 22 by comparator 23 is set within these times.

A first flip-flop circuit (hereinafter simply referred to as a first FF circuit) 29 responds to the above-mentioned set trigger signal output from the first control circuit 28 to output the enable signal EN1 to the comparator 23. It also responds to the reset trigger signal to erase the enable signal EN1 so that, while the FF circuit 29 outputs the enable signal EN1, or while the control circuit 28 outputs the reset trigger signal after the set trigger signal is outputted, the comparator 23 detects the presence or absence of the sync. pattern data and judges the detected result.

The set trigger signal from the first control circuit 28 is supplied to a second flip-flop circuit (hereinafter referred to as a second FF circuit) 30, and the reset trigger signal is output to an AND circuit 31.

The second FF circuit 30 is supplied at a reset input terminal R with the sync. signal detection signal SG1 (logic [H]) from the comparator 23 and supplies the AND circuit 31 with a signal of logic [H] (high) level during the period in which the sync. signal detection signal SG1 is supplied thereto after the set trigger signal from the control circuit 28. Accordingly, when the comparator 23 cannot detect the sync. pattern during the period from the predetermined sync. pattern detection starting time to the sync. pattern detection ending time, the AND circuit 31 outputs the set trigger signal logic [H] to a succeeding third flip-flop circuit (hereinafter referred to as a third FF circuit) 32.

A re-sync. timing counter (hereinafter referred to as a timing counter) 33 is supplied with the sync. signal detection signal SG1 and the re-sync. signal detection signal SG2 from the comparators 23 and 26 and reset to start the count operation again in response to these signals. A count value of the timing counter 33 is output to a second control circuit 34 and a latch signal thereof is output to an external apparatus (not shown).

The second control circuit 34 outputs a set trigger signal (logic [H]) to a set terminal S of the fourth flip-flop 35 later described when the count value of the timing counter 33 reaches a predetermined third value (hereinafter referred to as a first re-sync. pattern detection starting time), whereas the second control circuit 34 outputs a reset trigger signal (logic [H]) to a reset terminal R of the fourth flip-flop 35 when the count value of the timing counter 33 reaches a pre-determined fourth value (hereinafter referred to as a first re-sync. pattern detection ending time) that is larger than the re-sync. pattern detection starting time.

Incidentally, the re-sync. pattern detection starting time and the re-sync. pattern detection ending time are theoretically-or experimentally-obtained value, and a time of highest probability in which the re-sync. pattern data is stored in the shift register 24 and compared is set within these times after the sync. pattern data is detected.

A fourth flip-flop circuit (hereinafter referred to as a fourth FF circuit) 35 responds to the set trigger signal from the second control circuit 34 to output a signal of logic [H] (high) level to an AND circuit 36 and responds to the reset trigger signal to output a signal of logic [L] (low) level to the AND circuit 36.

Further, the AND circuit 36 is supplied with a signal from the third FF circuit 32 through a NOT circuit 37. It outputs an enable signal EN2 of logic [H] level through an OR circuit 38 to the aforementioned comparator 26 while the fourth FF circuit 35 outputs the signal of logic [H] level when the signal of the third FF circuit 32 is maintained in its logic [L] level state.

As described above, when comparator 23 detects the sync. pattern data, the sync. signal detecting signal SG1 is output and the second FF circuit 30 is reset. Therefore, the output of AND circuit 31 remains "L" and the output signal of the third FF circuit 32 maintains logic [L] state.

Accordingly, when the sync. pattern data is detected, the comparator 26 detects the presence or absence of a re-sync. pattern and judges the detected result while the period the reset signal is being output after the set trigger signal has been output from the second control circuit 34.

A third control circuit 39 is supplied with the count value from the reference clock counter 27 and outputs a set trigger signal when the count value reaches a pre-determined fifth value (hereinafter referred to as a second sync. pattern detection starting time) whereas the third control circuit 39 outputs a reset trigger signal when the input count value reaches a predetermined sixth value (hereinafter referred to as a second sync. pattern detection ending time).

The second re-sync. pattern detection starting time is preset to be ahead of the first re-sync. pattern detection starting time which is counted by the timing counter 33 when the comparator 23 detects the sync. pattern data. Also, the second re-sync. pattern detection ending time is set beforehand to be behind the first re-sync. pattern detection ending time which is counted by the timing counter 33 when the comparator 23 detects the sync. pattern data. Accordingly, the detection time (window) determined by the second re-sync. pattern detection starting time and the second re-sync. pattern detection ending time becomes longer than the detection time (window) determined by the first re-sync. pattern detection starting time and the first re-sync. pattern detection ending time. The second re-sync. pattern detection starting time is shorter than the first re-sync. pattern detection starting time and the second re-sync. pattern detection ending time is longer than the first re-sync. pattern detection ending time.

A fifth flip-flop circuit (hereinafter referred to as a fifth FF circuit) 40 responds to the set trigger signal of the third control circuit 39 to output a signal of logic [H] level to an AND circuit 41, and also responds to the reset trigger signal from the third control circuit 39 to output a signal of logic [L] level to the AND circuit 41.

The AND circuit 41 is supplied with a signal from the third FF circuit 32, and outputs an enable signal EN2 of logic [H] level through an OR circuit 38 to the comparator 26 while the fifth FF circuit 40 is outputting a signal of logic [H] level when the signal from the third FF circuit 32 is maintained in its logic [H] level state. As described above, the comparator 23 does not output the sync. detection signal SG1 (logic [H]) when the sync. pattern data is not detected. Therefore, the second FF circuit 30 is not reset. Thus, the set trigger signal (logic [H]) is output to the third FF circuit 32 from the AND circuit 31 and the output signal from the third FF circuit. 32 becomes logic [H]. In other words, when the sync. pattern data is not detected and the signal of the third FF circuit 32 is at its logic [H] level state, the comparator 26 detects the presence or absence of the re-sync. pattern only while the third control circuit 39 is outputting the set trigger signal after the reset trigger signal.

The set trigger signal from the third control circuit 39 is output to a reset input terminal R of a sixth flip-flop circuit (hereinafter referred to as a sixth FF circuit) 42, and the reset trigger signal therefrom is output to the third FF circuit 32 and the AND circuit 45.

The sixth FF circuit 42 is supplied at its set input terminal with the re-sync. signal detection signal SG2 from the comparator 26. The output from the FF circuit 42 is input to the AND circuit 45 through the NOT circuit (inverter) 44. The reset trigger signal output from the third control circuit 39 is input to the other input terminal of the AND circuit 45. Thus, if the re-sync. signal detection signal SG2 is not output from the comparator 26 until the reset trigger signal is output from the third control circuit 39, the signal RDNG which shows data read error is output from the AND circuit 45.

While the output signal from the third FF circuit 32 remains [L], the AND circuit 41 is closed and the AND circuit 37 is opened. Then the set trigger Signal and reset trigger signal output from the third control circuit 39 is not applied to the OR circuit 38. On the other hand, the set trigger signal and the reset trigger signal output from the second control circuit 34 is output to the comparator 26 through the OR circuit 38. That is, the detection of the re-sync. pattern data is inhibited at a timing based on the third control circuit 39 until the next sector from now on and the re-sync. pattern data by the comparator 26 is detected by the comparator 26 at a timing controlled by the second control circuit 34.

Figure 3:
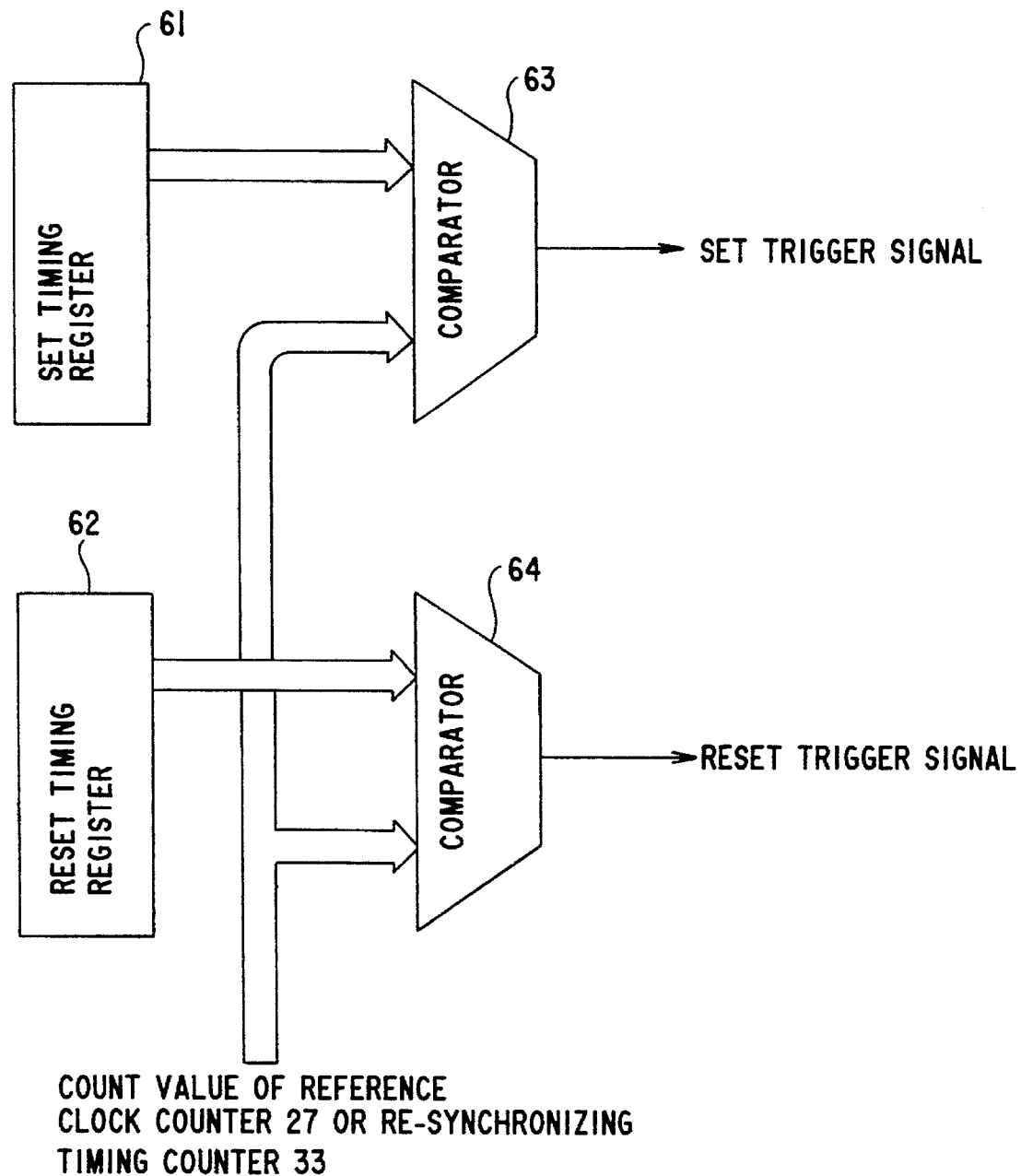
FIG. 3 shows one structure of the first, second and third control circuit.

FIG. 3 shows a first structural example of the first control circuit 28, the second control circuit 34 and the third control circuit.

In the drawing, the set timing register 62 stores the sync. pattern detection starting time (in case of the first control circuit 28), the first re-sync. pattern detection starting time (in case of the second control circuit 34) or the second re-sync. pattern detection starting time (in case of the third control circuit 39).

The reset timing register 62 stores the sync. pattern detection ending time (in case of the first control circuit 28), the first re-sync. pattern detection ending time (in case of the second control 39) or the second re-sync. pattern detection ending time (in case of the third control circuit 39).

In case of the first control circuit 28, the comparator 63 compares the sync. pattern detection starting time stored in the set timing register 61 and the count value output from the reference clock counter 27 and if they coincide, a set trigger signal is output to set terminal S of the first FF circuit 29. Similarly, in case of the second control circuit 34, the first re-sync. pattern detection starting time and the count value of the timing counter 33, and in case of the third control circuit 39, the second re-sync. pattern detection starting time and the count value of reference clock counter 27 are compared and when they coincide, a set trigger signal is output to the set terminal S of the fourth FF circuit 35 and the set terminal S of the fifth FF circuit 40, respectively.

In case of the first control circuit 28, the comparator 64 compares the sync. pattern detection ending time stored in the reset timing register and the count value of the reference clock counter 27, and when they coincide the reset trigger signal is output to reset terminal R of the first FF circuit 29. Similarly, in case of the second control circuit 34, the first re-sync. pattern detection ending time and the count value of the timing counter 33, and in case of the third control circuit 39, the second re-sync. pattern detection ending time and the reference clock counter 27 are respectively subjected to the comparison. When they coincide, the reset trigger signal is output to the reset terminal R of the fourth FF circuit 35 and the reset terminal R of the fifth FF circuit 40, respectively.

Figure 4:
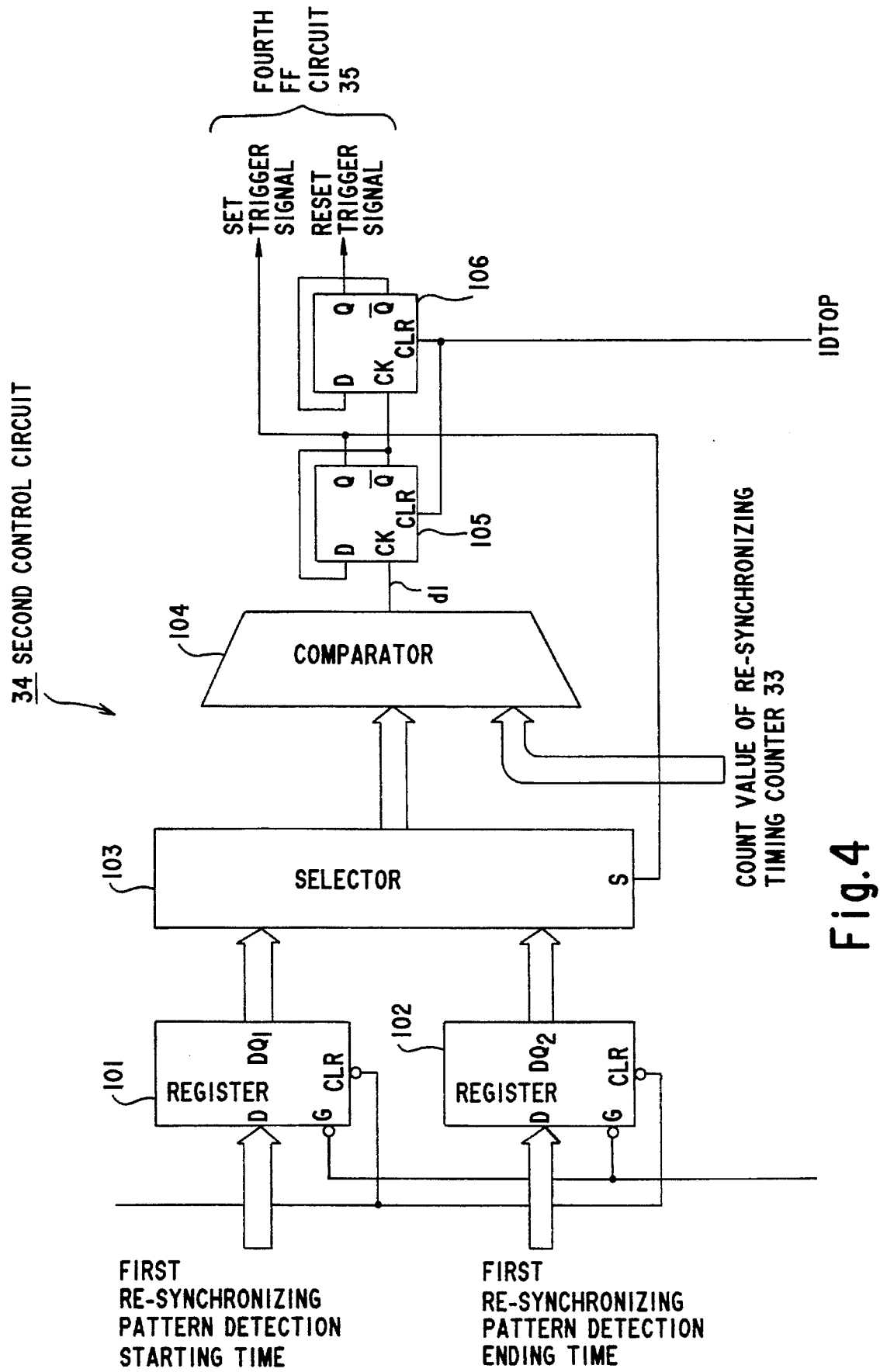
FIG. 4 shows another structure of the second control circuit.

FIG. 4 shows the second structural example of the second control circuit 34.

In the drawing, the registers 101 and 102 are for storing the first re-sync. detection starting time and the first re-sync. detection ending time synchronizing with a down edge of the clock CLK.

Select terminal S in the selector 103 selectively outputs the data stored in the register 101 at logic [L] and the data stored in register 102 at logic [H].

The comparator 104 compares the selected data output from the selector 103 and the count value of the re-sync. timing counter 33 and when they coincide, a detecting signal $d_1$ with logic [H] is output to the clock terminal CK of the D-flip-flop 105.

The D-flip-flops (called D-FF hereinafter) 105 and 106 connected serially, comprise a binary counter which counts up at a rising edge of a track signal supplied to a clock terminal CK. The Q output of the D-FF 105 is a select signal supplied to a select terminal S of selector 103 and is a set trigger signal supplied to a set terminal S of the fourth FF circuit 35 shown in FIG. 2. The D-FF 106 operates at a rising edge of the Q output of the D-FF 105 supplied to the clock terminal CK and the Q output is a reset trigger signal supplied to a reset terminal R of the fourth FF circuit 35 shown in FIG. 2. The D-FFs 105 and 106 are reset every time the detecting signal IDTOP is detected, which is produced upon detecting the head of the ID portion 10 of the respective sectors.

An operation of the second control circuit 34 is explained. The first re-sync. detection starting time and the first re-sync. pattern detection ending time are set in the registers 101 and 102, respectively, by an external control circuit, not shown.

The D-FF 105 and 106 are initially set to logic [L]. Therefore, the selector 103 outputs the first re-sync. pattern detection starting time stored in the register 101 to the comparator 104.

The comparator 104 compares the count value of the timing counter 33 with the first re-sync. pattern detection starting time and when the count value reaches the first re-sync. pattern detection starting time, detection signal $d_1$ of the logic [H] is output to the clock terminal CK of the D-FF 105. Thus, the Q output of the D-FF 105 changes from logic [L] to logic [H] to provide a set trigger signal to be output to set terminal S of the fourth FF circuit 35, thereby changing set terminal S of the selector 103 from logic [L] to logic [H]. Therefore, the selector 103 outputs the first re-sync. pattern detection ending time stored in register 102 to the comparator 104. Thus, the comparator 104 compares the first re-sync. pattern detection ending time with the count value of the timing counter 33. When the count value of the timing counter 33 reaches the first re-sync. pattern detection ending time, detecting signal $d_1$ of logic [H] is again output. Therefore, the $\overline{Q}$ output of the D-FF 105 changes from logic [H] to logic [L], thereby enabling the set trigger signal to be in active. The $\overline{Q}$ output of D-FF 105 changes from logic [L] to logic [H] and the Q output of the D-FF 106 changes from logic [L] to logic [H] and is applied to reset terminal R of the fourth FF circuit 35 at a reset trigger signal.

Figure 5:
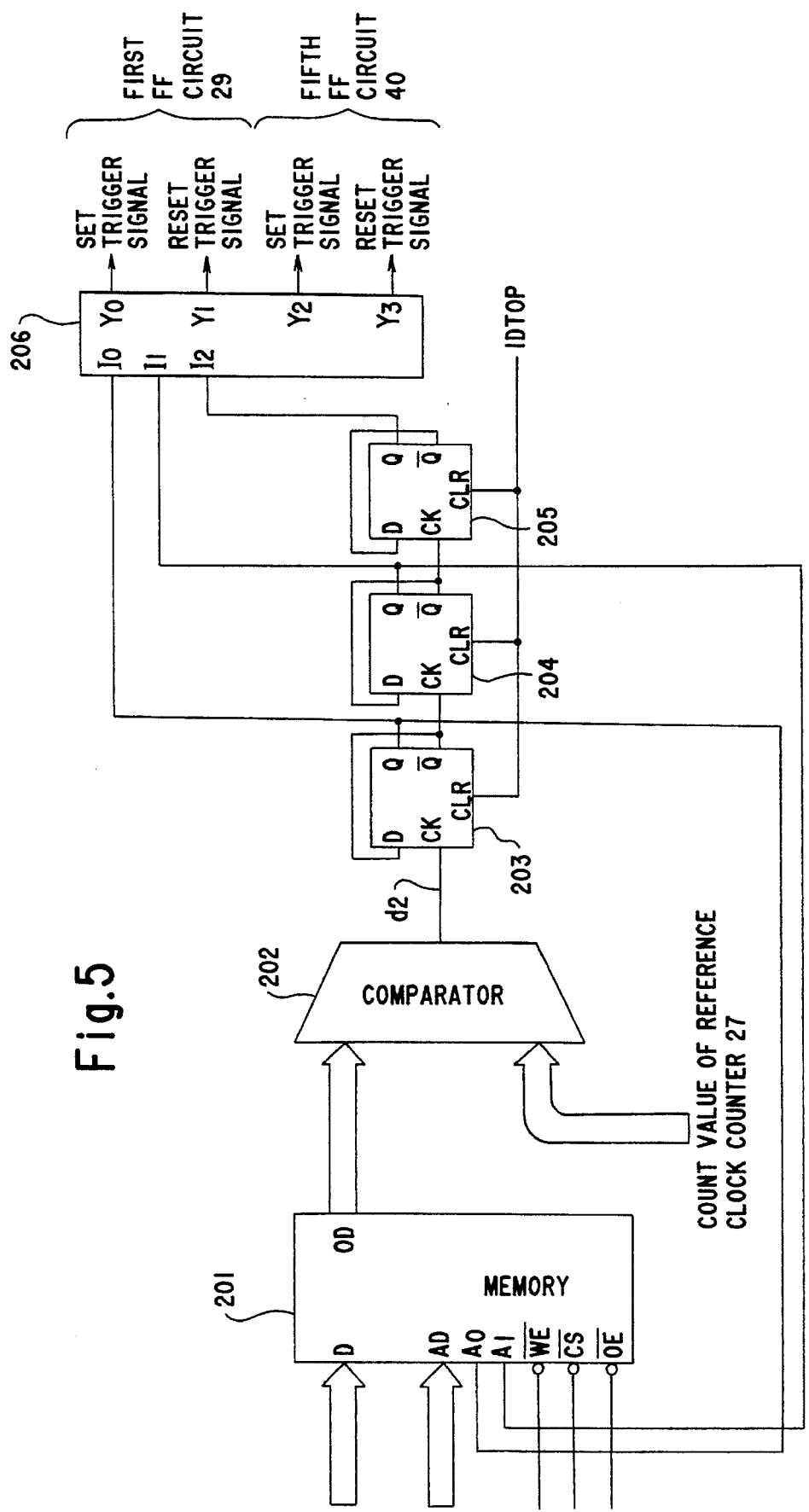
FIG. 5 shows a structure of a compound circuit of the first and the third control circuit.

Further, a circuit obtained by combining the first control circuit 28 and the third control circuit 39 is shown in FIG. 5.

In FIG. 5, the memory 201 is an SRAM (Static Random Access Memory) and has the sync. pattern detection starting time, sync. pattern detection ending time, and second asynchronizing pattern detection starting time and second asynchronizing pattern ending time stored in addresses "0" to "3", respectively. The memory 201 can perform a read/write when the chip select terminal $\overline{CS}$ is at logic [L]. When the output enable terminal of $\overline{OE}$ is at logic [L], $\overline{CS}$ is at logic [L], and write enable terminal $\overline{WE}$ is at logic [L], data is written. When write enable terminal $\overline{WE}$ is at logic [H], a data read out is performed. The address of the data read out is designated by read address signal input terminals $A_0$ and $A_1$.

The comparator 202 compares the data read from the memory 201 with the count value of the reference clock counter 27 and when the data accords with the count value, the detecting signal $d_2$ of logic [H] is output to the clock terminal CK of the D-flip-flop (called D-FF hereinafter) 203.

The D-FF 203, 204 and 205, connected serially, comprise a binary counter and the Q output of the D-FFs 203 and 204 are read address signals $A_0$ and $A_1$, respectively, of 2 bits of the memory 201.

The Q output of the D-FFs 203, 204 and 205 are applied to input terminals $I_0$, $I_1$ and $I_2$, respectively, of decoder 206. The D-FFs 203, 204 and 205 are reset every time the detection signal IDTOP is output. This signal is produced when the head of ID portion 10 of respective sectors is detected.

The decoder 206 has a function displayed in a truth table shown in FIG. 6. It enables output terminals $Y_0$, $Y_1$, $Y_2$, $Y_3$ to produce a set trigger signal to the set terminal S of the first FF circuit 29, a reset trigger signal to a reset terminal R of the first FF circuit 29, a set trigger signal to a set terminal S of the fifth FF circuit 35 and a reset trigger signal to a reset terminal R of the fifth FF circuit 35.

Next, the operation of the above circuit shown in FIG. 5 is explained.

The sync. pattern detection starting time, sync. pattern detection ending time, the second asynchronizing pattern detection starting time, and the second asynchronizing pattern detection ending time are written in the addresses "0" to "3" of the memory 201 by an external control circuit, not shown.

The read out of the optical disc starts through the record reproduction head and the data recorded at the head of the ID portion 10 of the sector is detected and when the detection signal IDTOP is output, the reference clock counter 27 is set and starts the count operation and the Q output of the D-FFs 203, 204 and 205 are reset to logic [L].

The chip select terminal $\overline{CS}$, the output enable terminal $\overline{OE}$ are set at logic [L] and write enable terminal $\overline{WE}$ are set at logic [L] by the control circuit, not shown, and the sync. pattern detection starting time is thus read out from address "0" of the memory 201 and output to the comparator 202.

When the count value of the reference clock counter 27 is equal to the sync. pattern detection starting time, a detection signal $d_2$ is output from the comparator 202 and the Q output of the D-FF 203 is set from logic [L] to logic [H]. Therefore, the input terminal $I_0$ of the decoder 206 turns to logic [H] and a set trigger signal is thus output from the output terminal $Y_0$ to the set terminal S of the first FF circuit 29. The read address signal terminal $A_0$ of the memory 201 changes from logic [L] to logic [H] and the sync. pattern detection ending time is read from address "1" of the memory 201 and output to the comparator 202.

When a count operation continues in synchronization with the reference clock RFCLK of the reference clock counter 27 and the count value of the reference clock counter 27 becomes equal to the sync. pattern detection ending time, the detection signal $d_2$ is again output from the comparator 202. Therefore, the Q output of the D-FF 203 changes from logic [H] to logic [L] and the Q output of the D-FF 204 changes to logic [H]. Therefore, the input terminals $I_0$, $I_1$ and $I_2$ of the decoder 206 become [L], [H] and [L], respectively, and the output of the output terminal $Y_0$ becomes logic [L]. This time also, the output of the output terminal $Y_1$ becomes logic [H], thereby outputting a reset trigger signal to a reset terminal of the first FF circuit 29. As the address signal input terminals $A_0$ and $A_1$ of the memory 201 become logic [L] and [H], respectively, this time the second re-sync. pattern detection starting time is read from address "2" of the memory 201 and is output to the comparator 202.

When the count value of the reference counter 27 becomes equal to the second re-sync. pattern detection starting time, the third detection signal $d_2$ is output from the comparator 202. Therefore, the Q output of the D-FF 203 again becomes logic [H] and the Q output of the D-FF 204 is maintained at the logic [H]. Thus, the input terminal $I_0$, $I_1$ and $I_2$ of the decoder 206 become [H], [H] and [L], respectively, and the output of the decoder 206 enables only output terminal $Y_2$ to be at logic [H]. The set trigger signal is thus output to the set terminal S of the fifth FF circuit 35. As both read address signal input terminals $A_0$ and $A_1$ of the memory 201 become logic [H], the second re-sync. pattern detection ending time is read out from memory address 3 of the memory 201 and is output to comparator 202.

Further, when the count operation of the reference clock counter 27 continues in synchronization with the reference clock RFCLK, the count value of the reference clock counter 27 becomes equal to the second re-sync. pattern detection ending time and then the fourth detection signal $d_2$ is output from the comparator 202. Therefore, the Q output of the D-FFs 203, 204 and 205 are at the logic [L], [L] and [H], respectively, and these logic values are applied to the input terminals $I_0$, $I_1$ and $I_2$ of the decoder 206. Only the output terminal $Y_0$ of the decoder 206 becomes logic [H] and the reset trigger signal is output to the reset terminal R of the fifth FF circuit 35. The read address signal input terminals $A_0$ and $A_1$ of the memory 201 are again initially set to [L].

An action of the thus arranged sync. signal reading apparatus of the optical disc is now explained.

Initially, an action in which the sync. pattern data is accurately detected will be explained with reference to FIG. 7.

When the count value of the reference clock counter 27 becomes identical to the pattern detection starting time, the first control circuit 28 outputs the set trigger signal and the first FF circuit 29 outputs the enable signal EN1 (logic [H]) shown in FIG. 7 to the comparator 23. Then, the comparator 23 responds to this enable signal EN1 to detect whether or not the sync. pattern data is included in the data sequentially read out from the optical disc.

When the comparator 23 detects the sync. pattern data and outputs the sync. signal detection signal SG1 during the enable signal EN1 being output, the timing counter 33 is reset and restarts the counting operation, whereas the second FF circuit 30 is set in the reset state. When the count value of reference clock counter 27 reaches the sync. pattern detection time, the reset trigger signal is output from the first control circuit 28,.the enable signal EN1 from the first FF circuit 29 is lost and the detection of the sync. pattern data and the judgment of the result detected by the comparator 23 is finished.

As described above, since the comparator 23 detects the sync. pattern data, thereby to reset second FF circuit 30 and outputs the sync. signal detection signal SG1, the set trigger signal is not output from the AND circuit 31 to the third FF circuit 32. Accordingly, the output of the third FF circuit 32 is not inverted and its signal is maintained at the logic [L] level. Consequently, since the signal of logic [L] level maintained by the third FF circuit 32 is input to the AND circuit 41, the comparator 26 is inhibited from detecting the re-sync. pattern data at a detection timing based on the third control circuit 39 (i.e., from the second re-sync. pattern detection starting time to the second re-sync. pattern detection ending time).

When the count value of the timing counter 33 reaches the first re-sync. pattern detection starting time, the second control circuit 34 outputs the set trigger signal to the fourth FF circuit 35 which outputs the signal of logic [H] level to the AND circuit 36. Thus the enable signal EN2 is output to the comparator 26 from the AND circuit 36 through the OR circuit 38, and the detection of the re-sync. pattern data is started by the comparator 26. When the comparator 26 detects the re-sync. pattern. data and outputs the re-sync. signal detection signal SG2, the timing counter 33 is reset and restarts the count operation as noted earlier. The detection of data in each re-sync. data portion 11c of the data portion 11 in this sector by comparator 26 is continued from now on on the basis of enable signal EN2 controlled by the second control circuit 34.

Figure 8:
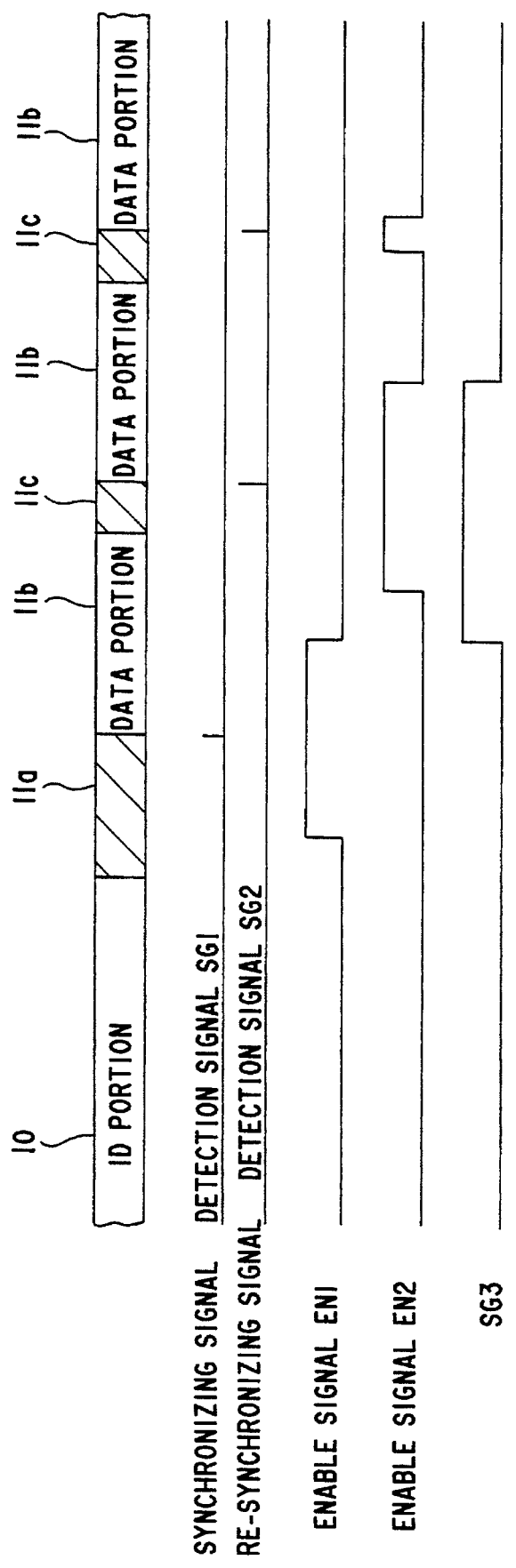
FIG. 8 is a timing chart of various signals used in the present invention, and to which references will be made in explaining a case where the detection of sync. pattern data fails.

An action in which the comparator 23 fails to detect the sync. pattern data within a detection time based on the first control circuit 28 will be explained next with reference to FIG. 8.

When the comparator 23 fails to detect the sync. pattern data within the above detection period, the sync. signal detection signal SG1 is output from the comparator 23. Thus the output of the second FF circuit 30 is not inverted and the second FF circuit 30 is maintained in its set state and the timing counter 33 is not reset. Accordingly, the reset trigger signal is output from the first control circuit 38, the set trigger signal is output to the third FF circuit 32 from the AND circuit 31, the output of the third FF circuit 32 being inverted and the third FF circuit 32 is placed in a set state in which the output signal thereof goes to logic [H] level.

In this state, since the signal of logic [L] level is input to the AND circuit 36 through the NOT circuit 37, the detection of the re-sync. pattern data read out after the sync. pattern data by the second control circuit 34. Conversely, since the signal of logic level [H] is input to the AND circuit 41, the detection of the re-sync. pattern data read out after the sync. pattern data by the third control circuit 39.

Then, when the count value of the reference clock counter 27 coincides with the second sync. pattern detection starting time, the third control circuit 39 outputs the set trigger signal to enable the comparator 26 to start the detection of the re-sync. pattern data. This detection is started earlier than the detection starting time at which the second control circuit 34 starts the detection.

More specifically, since the detection of the sync. pattern data has failed, a reference timing (sync. signal detection signal SG1) for reading the re-sync. pattern data is not determined and the timing at which the re-sync. pattern data appears is fluctuates by substantially the same amount as the timing at which the sync. pattern appears and thus the detection of the re-sync. pattern starts at an earlier stage. Further, the re-sync. pattern detection ending time is delayed as compared with the first re-sync. pattern detection ending time in an opposite manner to the second re-sync. pattern detection starting time. Accordingly, even when the detection of the sync. pattern data has failed, and as the re-sync. pattern data starts detection ending time of comparator 26 is more extended forward and backward as compared with the case the sync. pattern data detection is successful. The re-sync. pattern data following the sync. pattern data can be detected with certainty even in the case the timing for reading the following re-sync. pattern data being read out from the record reproduction head cannot be detected.

If the comparator 26 detects and judges the re-sync. pattern data during this detection time determined by the second re-sync. pattern detection starting time and second re-sync. pattern detection ending time, then the comparator 26 outputs the re-sync. signal detection signal SG2 to the timing counter 33 and also outputs it to the sixth FF circuit 42. Then, the timing counter 33 is reset and the timing counter 33 starts the count operation for detecting the succeeding re-sync. pattern data in this sector. When the reset trigger signal is output from the third control circuit 39, the output of the third FF circuit 32 is inverted (from logic [H] level to logic [L] level).

Accordingly, the following detection of the succeeding re-sync. pattern data is performed on the basis of the second control circuit 34 from the third control circuit 39. In this case, if the re-sync. detection signal SG2 is not output, the output of sixth FF circuit 42 is not reversed and signal RDNG designating a failure of the data read is output from AND circuit 45 in synchronization with a reset trigger signal output from the third control circuit 39 to the fifth FF circuit.

In the prior art, the detection time of the succeeding re-sync. pattern data is determined so as to fall in a narrow range on the basis of the detection of the sync. pattern data so that, when the detection of the first sync. pattern data has failed, the succeeding re-sync. pattern data cannot be detected and the data of the sector cannot be read out. However, in accordance with this embodiment, since the detection time of the re-sync. pattern data is extended forward and backward, even if the detection of the first sync. pattern data has failed, the re-sync. pattern data can be positively captured and detected, and data following the detected re-sync. pattern data can be read out. Further, data of one divided unit between the sync. pattern dropped out and the first re-sync. pattern can be reproduced by the error correcting circuit, which can as a result reduce the data read error rate. The error correcting circuit produces a CRC for the interleaved data and ECC based on the data, the control word and the above CRC in units of an interleave, thereby adding CRC and ECC to data for recording.

As set out above in detail, according to the present invention, even when the detection of the sync. signal has failed, the succeeding re-sync. signal can be detected positively so that, although the first divided unit of data is dropped out, the data following the first re-sync. signal can be reliably read out. This reduces the data read error rate, thus achieving a great advantage for a method and apparatus for reading a synchronizing signal from a recording medium.

Having described the preferred embodiment of the invention with reference to the accompanying drawings, it is to be understood that the invention is not limited to that precise embodiment and that various changes and modifications thereof could be affected by one skilled in the art without departing from the spirit or scope of the invention as defined in the appended claims.

What is claimed is:

1. A method of reading a synchronizing signal of a recording medium having a sector in which an address portion and a data portion are recorded, said data portion having synchronizing pattern data at a front part thereof, and a plurality of divided data portions and re-synchronizing pattern data between the divided data portions, said method comprising the steps of:

detecting said synchronizing pattern data;

determining if the detection of the synchronized pattern data is successful;

setting a predetermined time period to be a first time period if said detection is successful, and a second time period, longer than said first time period, if said detection is unsuccessful; and detecting the re-synchronizing pattern data within said predetermined time period.

2. A synchronizing signal reading apparatus for a recording medium, said recording medium having a sector in which an address portion and a data portion are recorded, said data portion having synchronizing pattern data at a front part thereof, and a plurality of divided data portions and re-synchronizing pattern data between the divided data portions, said synchronizing signal reading apparatus comprising:

a synchronizing pattern detecting means for first detecting said synchronizing pattern data provided at a front part of said data portion read from said recording medium on which a plurality of sectors are formed on a track;

re-synchronizing pattern detecting means for second detecting re-synchronizing pattern data provided between the divided data portion read from said recording medium;

synchronizing pattern detecting judging means for judging whether the first detection by said synchronizing pattern detecting means is successful;

re-synchronizing pattern detecting judging means for judging, within a predetermined period, whether the second detection by said re-synchronizing pattern detecting means is successful; and control means for controlling a predetermined time period for detecting by said re-synchronizing pattern detecting judging means based on the judgment by said synchronizing pattern detecting judging means, said predetermined time period being a first effective time period when said first detection by said synchronization pattern detecting means is successful, and said time period being a second effective time period when said first detection is unsuccessful, said second effective time period being longer than said first effective time period.

3. A synchronizing signal reading apparatus for a recording medium, said recording medium having a sector in which an address portion and a data portion are recorded, said data portion having synchronizing pattern data at a front part thereof, and a plurality of divided data portions and re-synchronizing pattern data between the divided data portions, said synchronizing signal reading apparatus comprising:

a synchronizing pattern detecting means for first detecting said synchronizing pattern data provided at a front part of said data portion read from said recording medium on which a plurality of sectors are formed on a track;

re-synchronizing pattern detecting means for second detecting re-synchronizing pattern data provided between the divided data portion read from said recording medium;

synchronizing pattern detecting judging means for judging whether the first detection by said synchronizing pattern detecting means is successful;

re-synchronizing pattern detecting judging means for judging, within a predetermined period, whether the second detection by said re-synchronizing pattern detecting means is successful; and control means for controlling a predetermined time period for detecting by said re-synchronizing pattern detecting judging means based on the judgment by said synchronizing pattern detecting judging means, said predetermined time period being a first effective time period when said first detection by said synchronization pattern detecting means is successful, and said time period being a second effective time period when said first detection is unsuccessful, wherein said re-synchronizing pattern detecting means and said re-synchronizing pattern detection judging means comprises:

re-synchronizing pattern data storing means for storing said re-synchronizing pattern data;

a first reading data storing means for storing a latest data having the same bit number as said re-synchronizing pattern data read from said recording medium;

a first comparing means for comparing whether the read out data stored in said first reading data storing means is equal to said re-synchronizing pattern data stored in said re-synchronizing pattern data storing means;

a first effective time period setting means for setting said first effective time period in which said first comparing means performs a comparison of said re-synchronizing pattern data and said read out data;

a second effective time period setting means for setting said second effective time period in which said first comparing means performs a comparison in a time period which is longer in a backward and/or forward direction than the first effective time period set by said first effective time period setting means; and said control means controls said synchronizing pattern detecting judging means so that, when it succeeds in detecting said synchronized pattern data, said first comparing means performs a comparison during the first effective time period set by said first effective time period setting means such that, when it fails to detect said synchronizing pattern data, said first comparing means performs the comparison during the effective time period determined by said second effective time period setting means.

4. The synchronizing signal reading apparatus according to claim 3, wherein said first effective time period setting means comprises:

a first counter for performing a count operation in synchronization with a clock of a first frequency, said first counter generating a present count value;

a first count value storing means for storing a predetermined first count value;

a second count value storing means for storing a predetermined second count value;

a second comparing means for comparing whether the present count value of said first counter accords with the predetermined first count value stored in said first count value storing means and for enabling said first comparing means to start a comparison operation when both count values are consistent; and a third comparing means for comparing whether said present count value of the first counter accords with the second count value stored in the second count value storing means, for enabling said first comparison means to stop the comparison operation, and ensuring that the present count value of the first counter accords with the second count value.

5. The synchronizing signal reading apparatus according to claim 3, wherein said second effective time setting means comprises:

a second counter for performing a count operation in synchronization with a second clock of a second frequency, said second counter generating a present count value;

a third count value storing means for storing a predetermined third count value;

a fourth count value storing means for storing a predetermined fourth count value;

a fourth comparison means for comparing whether the present count value of the second counter accords with the predetermined third count value stored in the third count value storing means and for enabling said first comparison means to start the comparison operation when both count values accord with each other; and a fifth comparison means for comparing whether the present count value of the second counter accords with the predetermined fourth count value stored in the fourth count value storing means and for enabling said first comparison means to stop the comparison operation when both count values accord with each other.

6. The synchronizing signal reading apparatus according to claim 4, wherein said second effective time setting means comprises:

a second counter for performing a count operation in synchronization with a second clock of a second frequency, said second counter generating a present count value;

a third count value storing means for storing a predetermined third count value;

a fourth count value storing means for storing a predetermined fourth count value;

a fourth comparison means for comparing whether the present count value of the second counter accords with the predetermined third count value stored in the third count value storing means and for enabling said first comparison means to start the comparison operation when both count values accord with each other; and a fifth comparison means for comparing whether the present count value of the second counter accords with the predetermined fourth count value stored in the fourth count value storing means and for enabling said first comparison means to stop the comparison operation when both count values accord with each other.

7. The synchronizing signal reading apparatus according to claim 3, wherein said second effective time period setting means comprises:

a third counter for performing a counting operation in synchronization with a clock of the third frequency;

a fifth count value storing means for storing a fifth count value;

a sixth count value storing means for storing a sixth count value;

a selection means coupled to said fifth count value storing means and said sixth count value storing means for selecting, based on instructions from said control means, said fifth count value stored in said fifth count value storing means or the sixth count value stored in said sixth count value storing means; and a sixth comparing means coupled to said selection means and to said third counter for comparing said fifth count value selected by said selecting means with the count value of said third counter, enabling said first comparing means to start a comparison operation when the count value of the third counter accords with the fifth count value, enabling said selection means to select the sixth count value, comparing the sixth count value output from said selection means with the count value of the third counter and enabling said first comparing means to stop the comparison operation when said count value of the third counter accords with the sixth count value.

8. The synchronizing signal reading apparatus according to claim 4, wherein said second effective time period setting means comprises a third counter for performing a counting operation in synchronization with a third clock of a third frequency;

a fifth count value storing means for storing a fifth count value;

a sixth count value storing means for storing a sixth count value;

a selection means coupled to-said fifth count value storing means and said sixth count value storing means for selecting, based on instructions from said control means, said fifth count value stored in said fifth count value storing means or said sixth count value stored in said sixth count value storing means; and a sixth comparing means coupled to said selection means and to said third counter for comparing said fifth count value selected by said selecting means with the count value of said third counter, enabling said first comparing means to start the comparison operation when the count value of the third counter accords with the fifth count value, enabling said selection means to select the sixth count value, comparing the sixth count value output from said selection means with a count value of said third counter and enabling said first comparing means to stop third comparison operation when said count value of said third counter accords with the sixth count value.

9. The synchronizing signal reading apparatus according to claim 6, wherein said sixth comparing means enables said selection means to select the fifth count value stored in said fifth count value storing means when said count value of the third counter accords with the sixth count value.

10. The synchronizing signal reading apparatus according to claim 8, wherein said sixth comparing means enables said selection means to select the fifth count value stored in said fifth count value storing means when said count value of the third counter accords with the sixth count value.

11. A synchronizing signal reading apparatus for a recording medium, said recording medium having a sector in which an address portion and a data portion are recorded, said data portion having synchronizing pattern data at a front part thereof, and a plurality of divided data portions and re-synchronizing pattern data between the divided data portions, said synchronizing signal reading apparatus comprising:

a synchronizing pattern detecting means for first detecting said synchronizing pattern data provided at a front part of said data portion read from said recording medium on which a plurality of sectors are formed on a track;

re-synchronizing pattern detecting means for second detecting re-synchronizing pattern data provided between the divided data portion read from said recording medium;

synchronizing pattern detecting judging means for judging whether the first detection by said synchronizing pattern detecting means is successful;

re-synchronizing pattern detecting judging means for judging, within a predetermined period, whether the second detection by said re-synchronizing pattern detecting means is successful; and control means for controlling a predetermined time period for detecting by said re-synchronizing pattern detecting judging means based on the judgment by said synchronizing pattern detecting judging means, said predetermined time period being a first effective time period when said first detection by said synchronization pattern detecting means is successful, and said time period being a second effective time period when said first detection is unsuccessful, wherein said synchronizing pattern detecting means and said synchronizing pattern detecting judging means comprise a synchronizing pattern data storing means for storing said synchronizing pattern data;

a second reading data storing means for storing a latest data having the same bit number as a synchronizing pattern data read from said recording medium;

a seventh comparing means for comparing the data stored in said synchronizing pattern data storing means with the data stored in said second reading data storing means; and a third effective time period setting means for setting a third effective time period in which said seventh comparing means performs the comparison.

12. The synchronizing signal reading apparatus according to claim 11, wherein said first effective time setting means and said third effective time setting means comprises:

storing means for storing a seventh count value designating a start of the third effective time period, an eighth count value designating a completion of the third effective time, a ninth count value designating a start of the first effective time and a tenth count value designating completion of the first effective time;

read control means for performing a control so that the seventh count value, the eighth count value, the ninth count value and the tenth count value are stored in said storing means and output therefrom in this order;

a fourth counter for performing a count operation in synchronization with a clock of the fourth frequency;

detecting means for detecting whether the count value of the fourth counter coincides with the count value output from said storing means; and means for providing an instruction such that, when said detecting means detects that the count value of the fourth counter coincides with the seventh count value, the seventh comparison means starts a comparison operation; when said detecting means detects that the count value of the fourth counter coincides with the eighth count value, said seventh comparison means stops the comparison operation; when said detecting means detects that the count value of the fourth counter coincides with the ninth count value, said first comparison means starts the comparison operation; and when said detecting mean detects that the count value of the fourth counter coincides with the tenth count value, the first comparison means stops the comparison operation.

* * * * *